US011586047B2

(12) United States Patent
Murata et al.

(10) Patent No.: US 11,586,047 B2
(45) Date of Patent: Feb. 21, 2023

(54) HEAD-UP DISPLAY DEVICE

(71) Applicant: Yazaki Corporation, Tokyo (JP)

(72) Inventors: Naohisa Murata, Makinohara (JP);
Yasuhiro Katsumata, Makinohara (JP);
Koichiro Hagiwara, Makinohara (JP);
Yusuke Fujimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/545,288

(22) Filed: Dec. 8, 2021

(65) Prior Publication Data
US 2022/0179216 A1  Jun. 9, 2022

(30) Foreign Application Priority Data
Dec. 9, 2020  (JP) .............................. JP2020-203915

(51) Int. Cl.
| G02B 27/01 | (2006.01) |
| B60K 35/00 | (2006.01) |
| G03B 21/28 | (2006.01) |
| G02F 1/157 | (2006.01) |
| G02B 7/182 | (2021.01) |
| G03B 21/14 | (2006.01) |

(52) U.S. Cl.
CPC .......... *G02B 27/0172* (2013.01); *B60K 35/00* (2013.01); *B60K 2370/1529* (2019.05); *G02B 7/182* (2013.01); *G02B 7/1821* (2013.01); *G02B 27/01* (2013.01); *G02B 2027/011* (2013.01); *G02F 1/157* (2013.01); *G03B 21/142* (2013.01); *G03B 21/28* (2013.01)

(58) Field of Classification Search
CPC .... G02B 27/0172; G02B 27/01; G02B 7/182; G02B 7/1821; G02B 2027/011; G02F 1/157; G03B 21/28; G03B 21/142; B60K 35/00; B60K 2370/1529
USPC ............................................................ 345/7
See application file for complete search history.

(56) References Cited

U.S. PATENT DOCUMENTS

| 4,790,639 A * | 12/1988 | Baumgarten ............ G02B 5/08 |
| | | 359/221.1 |
| 6,556,331 B1 | 4/2003 | Karasaki et al. |
| 2012/0229882 A1* | 9/2012 | Fish, Jr. .................. B60R 1/088 |
| | | 359/267 |
| 2013/0027795 A1 | 1/2013 | Brown |

(Continued)

FOREIGN PATENT DOCUMENTS

| CN | 110187468 A | 8/2019 |
| JP | 7-37403 A | 2/1995 |

(Continued)

*Primary Examiner* — Tom V Sheng
(74) *Attorney, Agent, or Firm* — Sughrue Mion, PLLC (57) ABSTRACT

There is provided a head-up display device including: a display configured to emit a display light ray therefrom, a reflection member configured to pivot around a rotation axis and reflect the display light ray to project a display image; and a housing configured to accommodate the reflection member. The reflection member has a plurality of ribs protruding from a surface on an opposite side to a reflection surface which reflects the display light ray, and the plurality of ribs have a portion in which a height on an outer side in a rotational direction centered at the rotation axis is lower than that on an inner side in the rotational direction.

6 Claims, 9 Drawing Sheets

(56) References Cited

U.S. PATENT DOCUMENTS

| | | | |
|---|---|---|---|
| 2018/0083422 A1* | 3/2018 | Castiglia | H04N 9/3164 |
| 2018/0348619 A1* | 12/2018 | Taniguchi | G03B 21/28 |
| 2019/0243053 A1* | 8/2019 | Ono | G01D 7/00 |
| 2021/0003815 A1* | 1/2021 | Tabata | G02B 27/0101 |
| 2021/0080718 A1* | 3/2021 | Sato | G02B 27/0101 |
| 2022/0004004 A1* | 1/2022 | Masuda | G02B 27/0172 |

FOREIGN PATENT DOCUMENTS

| | | |
|---|---|---|
| JP | 7-117301 A | 5/1995 |
| JP | 11-137468 A | 5/1999 |
| JP | 2016-217041 A | 12/2016 |
| JP | 6107380 B2 | 4/2017 |
| WO | 2019124331 A1 | 6/2019 |
| WO | 2019189607 A1 | 10/2019 |

* cited by examiner

HEAD-UP DISPLAY DEVICE

CROSS-REFERENCE TO RELATED APPLICATIONS

This application is based on and claims priority under 35 USC 119 from Japanese Patent Application No. 2020-203915 filed on Dec. 9, 2020, the contents of which are incorporated herein by reference.

TECHNICAL FIELD

The present disclosure relates to a head-up display device.

BACKGROUND ART

In a recent year, a head-up display device provided on an upper surface of a dashboard of a vehicle is known. This head-up display device has a display and a mirror which reflects an image or the like displayed on the display toward a windshield. A driver of the vehicle recognizes the display image projected on the windshield as a virtual image. Furthermore, in this head-up display device, the mirror includes a plurality of ribs to ensure its rigidity. See, for example, JP6107380B2.

SUMMARY OF INVENTION

Here, in the head-up display device described in JP6107350B2, a height position of the virtual image displayed on the windshield can be changed by pivoting the mirror around a rotation axis. However, since the head-up display device described in JP6107350B2 has the plurality of ribs on the mirror, the ribs protruding from the mirror body also pivot about the rotation axis when the mirror rotates. Therefore, in the head-up display devices with the ribs on the mirror, the ribs are more likely to interfere with a device housing compared to head-up display devices without ribs, and thus it is necessary to create a large housing in advance.

Therefore, it is conceivable to increase a mirror thickness without providing the ribs, but in this case, manufacturing takes time due to an increase in the mirror thickness. Also, it is conceivable to change a material of the mirror to one with high rigidity without increasing the mirror thickness, but in this case, moldability deteriorates. As a result, it takes time to manufacture and quality is affected.

The present disclosure is to provide a head-up display device which can suppress an increase in size of a housing while suppressing a prolongation of manufacturing time and deterioration of quality.

According to an aspect of the present disclosure, a head-up display device includes: a display configured to emit a display light ray therefrom, a reflection member configured to pivot around a rotation axis and reflect the display light ray to project a display image; and a housing configured to accommodate the reflection member. The reflection member has a plurality of ribs protruding from a surface on an opposite side to a reflection surface which reflects the display light ray, and the plurality of ribs have a portion in which a height on an outer side in a rotational direction centered at the rotation axis is lower than that on an inner side in the rotational direction.

DESCRIPTION OF EMBODIMENTS

Hereinafter, the present disclosure will be described with reference to preferred embodiments. The present disclosure is not limited to the embodiments shown below and can be appropriately modified without departing from the spirit of the present disclosure.

Further, in the embodiments shown below, some parts of configurations are not shown or described. However, it goes without saying that, as for the details of the omitted technology, publicly known or well-known technology is appropriately applied within a range that does not cause a contradiction with the contents described below.

Figure 1:
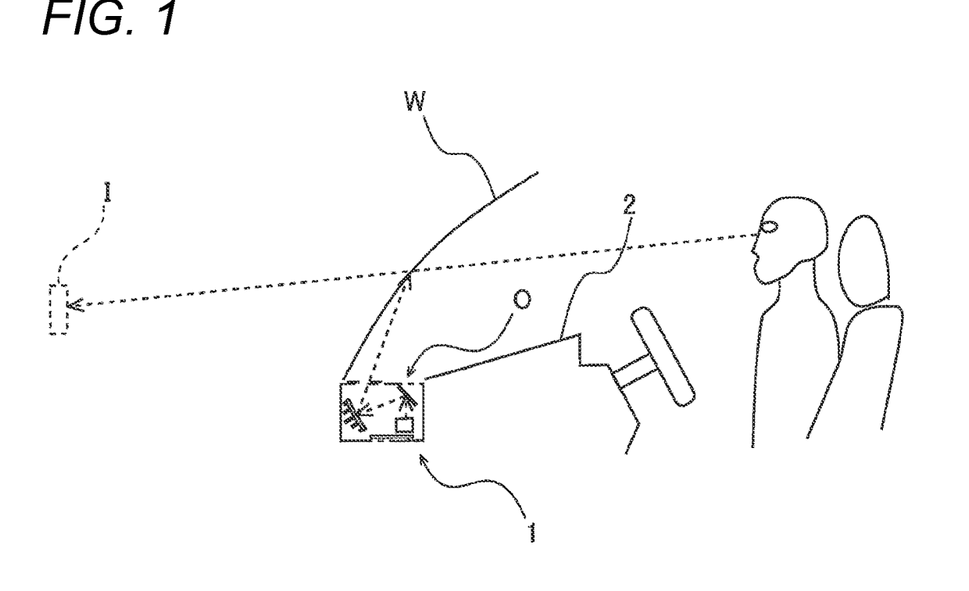
FIG. 1 is a schematic side view illustrating a head-up display device according to an embodiment of the present disclosure.
Figure 2:
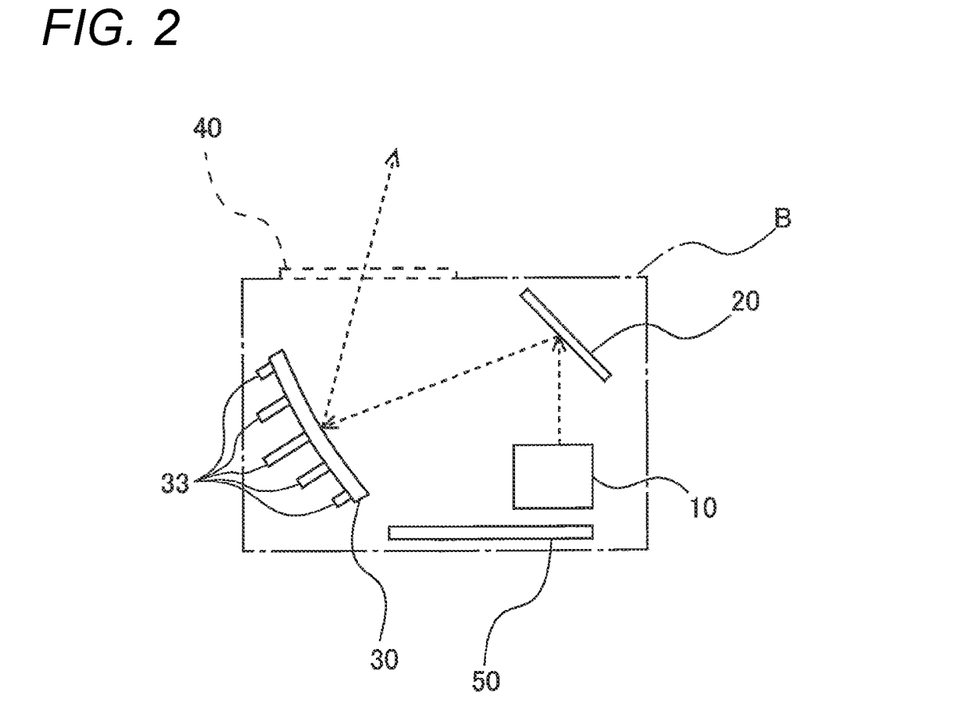
FIG. 2 is a partially enlarged view of FIG. 1.

FIG. 1 is a schematic side view illustrating a head-up display device according to an embodiment of the present disclosure and FIG. 2 is a partially enlarged view of FIG. 1.

As illustrated in FIG. 1, a head-up display device 1 according to the embodiment is accommodated and arranged in an opening portion O formed on an upper surface of an instrument panel 2 of a vehicle. As illustrated in FIG. 2, the head-up display device 1 includes a display 10, a reflecting mirror 20, a concave mirror (reflection member) 30, a cover member 40, and a control board 50. Further, the head-up display device 1 includes a housing B, and the display 10, the reflecting mirror 20, the concave mirror 30, and the control board 50 are accommodated in the housing B.

The display 10 emits information to be provided to a driver as a display light ray. The display light ray from the display 10 is emitted toward the reflecting mirror 20 illustrated in FIG. 2 and is reflected by the reflecting mirror 20 toward the concave mirror 30. The concave mirror 30 reflects the display light ray and projects a display image onto a windshield W (see FIG. 1) of the vehicle through the transparent cover member 40 provided in an opening of the housing B. The display image projected on the windshield W is recognized by the driver as a virtual image I.

Here, the concave mirror 30 has shaft portions 32 (see FIG. 3) and is configured to pivot about a rotation axis AR (see FIG. 3) connecting the shaft portions 32 to each other. A rotation mechanism (not illustrated) is attached to such a concave mirror 30. By controlling the rotation of the concave mirror 30 around the rotation axis AR by the rotation mechanism, a projection position (height position) of the displayed image on the windshield W can be changed.

The control board 50 is equipped with a control unit which controls the entire head-up display device 1. The control board 50 controls the display light ray of the display 10 and controls the rotation of the concave mirror 30 by the rotation mechanism.

Figure 3:
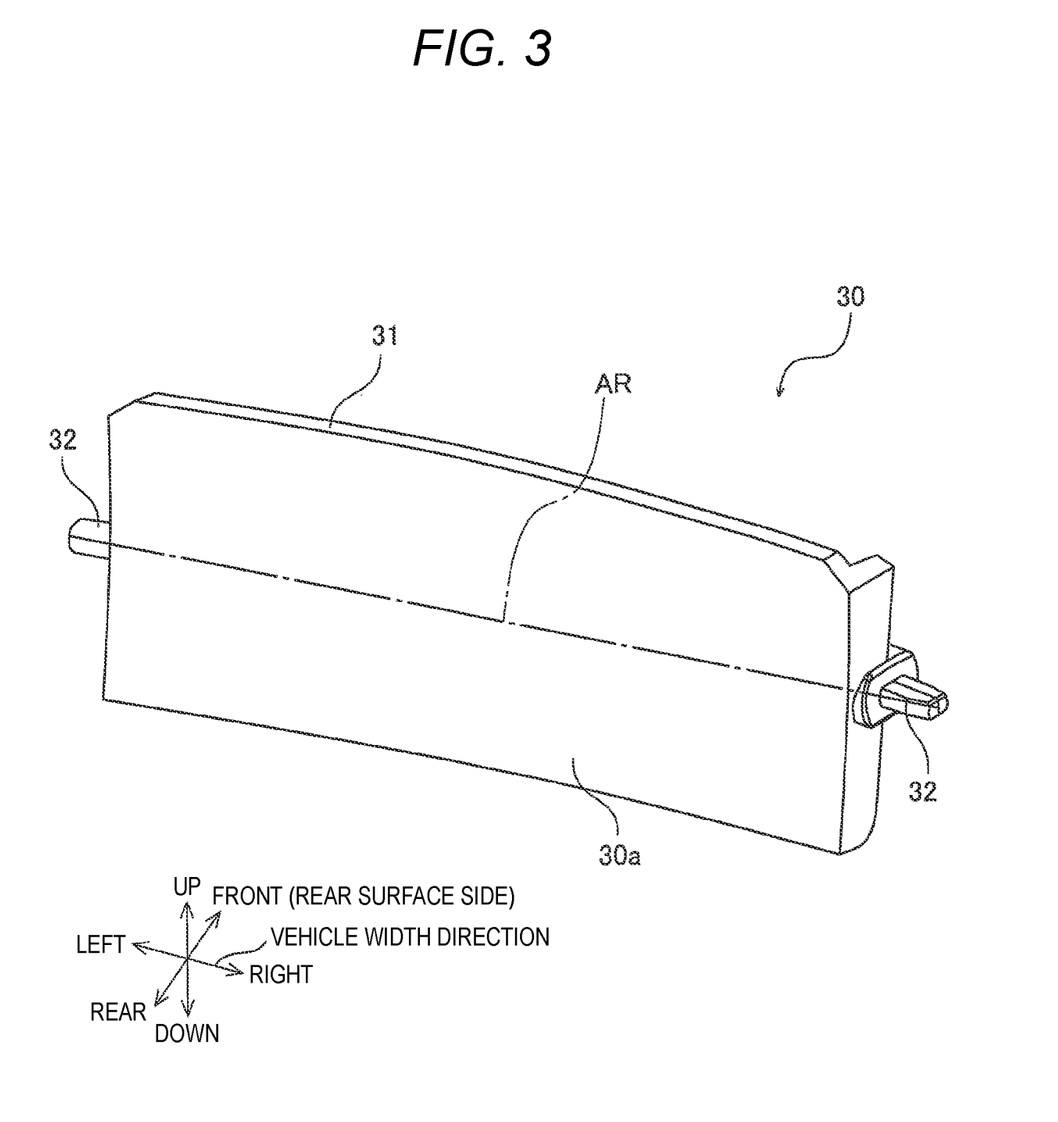
FIG. 3 is a front perspective view illustrating details of a concave mirror illustrated in FIG. 2.
Figure 4:
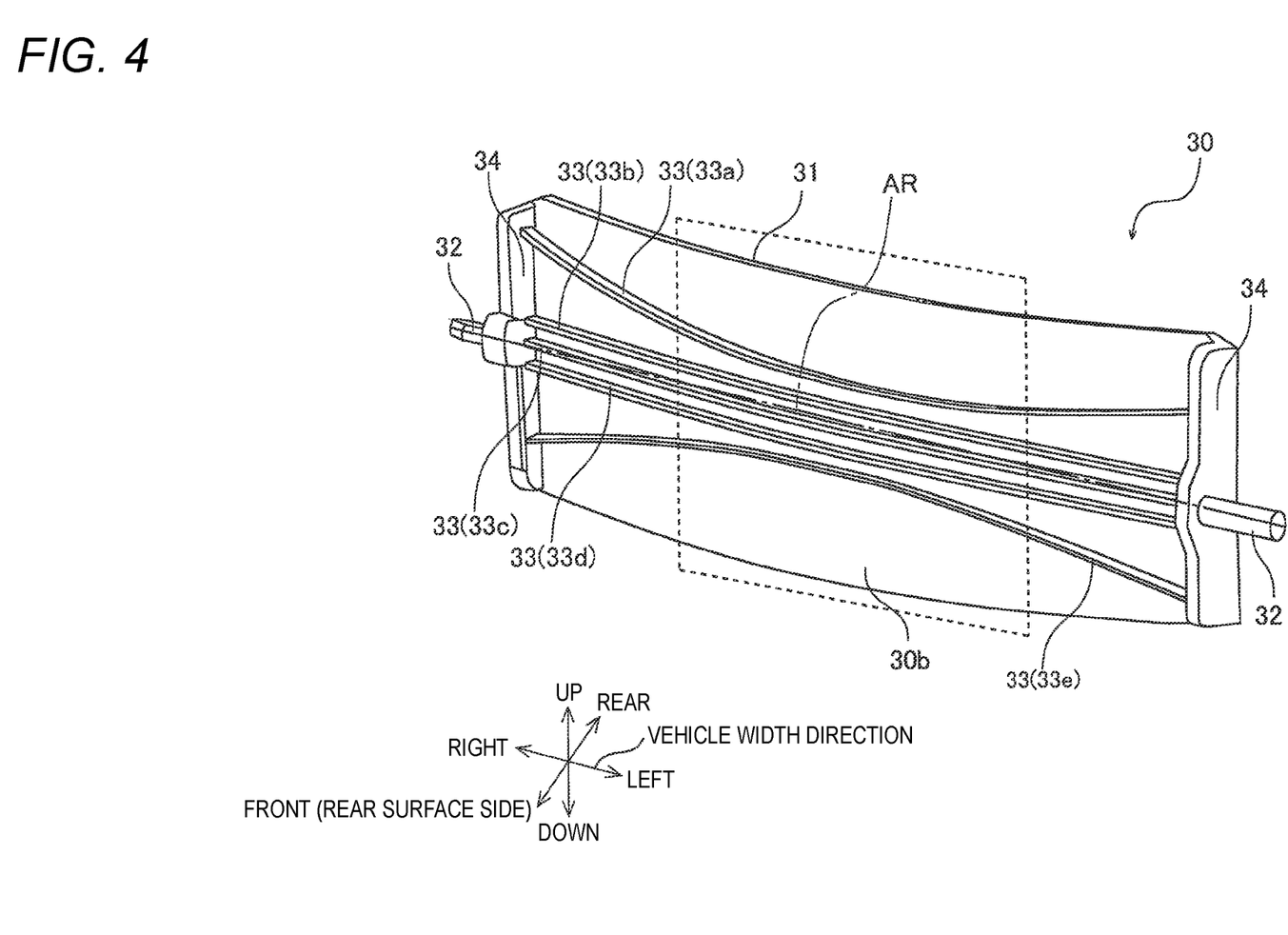
FIG. 4 is a rear perspective view illustrating details of the concave mirror illustrated in FIG. 2.

FIG. 3 is a front perspective view illustrating the details of the concave mirror 30 illustrated in FIG. 2 and FIG. 4 is a rear perspective view illustrating the details of the concave mirror 30 illustrated in FIG. 2.

As illustrated in FIGS. 3 and 4, the concave mirror 30 includes a mirror body 31 having a horizontally long reflection surface 30a whose longitudinal direction is parallel to a vehicle width direction. The mirror body 31 has a curved plate structure in which the reflection surface 30a side is recessed and a surface 30b on an opposite side to the reflection surface 30a protrudes. Such a concave mirror 30 is provided with the shaft portions 32 at both ends in the longitudinal direction thereof. The shaft portion 32 is directly or indirectly supported by the housing B (see FIG. 2) or the like of the head-up display device 1 and the concave mirror 30 is configured to pivot about the rotation axis AR connecting the two shaft portions 32.

In the embodiment, the shaft portion 32 is provided so as to protrude from the concave mirror 30. However, the present disclosure is not limited to this, a shaft portion protruding from the housing B (see FIG. 2) side may be provided and the concave mirror 30 may be formed with a recess portion into which the shaft portion fits.

Further, the concave mirror 30 includes a plurality of ribs 33 and an auxiliary side wall 34 as illustrated in FIG. 4. The plurality of ribs 33 are wall members which protrude forward from the surface 30b on the opposite side to the reflection surface 30a. In the embodiment, the plurality of ribs 33 are composed of first to fifth ribs 33a to 33e. The first to fifth ribs 33a to 33e are provided so as to extend substantially in the vehicle width direction (direction along the rotation axis AR).

In the first rib 33a upwardly farthest from the rotation axis AR and the fifth rib 33e downwardly farthest from the rotation axis AR of the first to fifth ribs 33a to 33e, portions located on a central side than both end sides of the rotation axis AR are formed to be curved from an outer side of a rotational direction toward an inner side of the rotational direction (that is, the rotating axis AR side). On the other hand, the second to fourth ribs 33b to 33d provided in a vicinity of the rotation axis AR are formed linearly along the rotation axis AR in a plan view. Further, the first rib 33a and the fifth rib 33e are preferably curved with a constant curvature. This is because it is easy to obtain the desired rigidity and the processing cost can be suppressed. Further, it is preferable that the curvature of the first rib 33a and the curvature of the fifth rib 33e be set to the same value. This is because it can contribute to reducing the variation in rigidity on both sides interposing the rotation axis AR.

The auxiliary side walls 34 are wall members provided on both end sides of the concave mirror 30 and protrude toward a rear surface side. The auxiliary side walls 34 are located on both end sides of the plurality of ribs 33, and are formed to protrude toward the rear surface side higher than the plurality of ribs 33.

Figure 5:
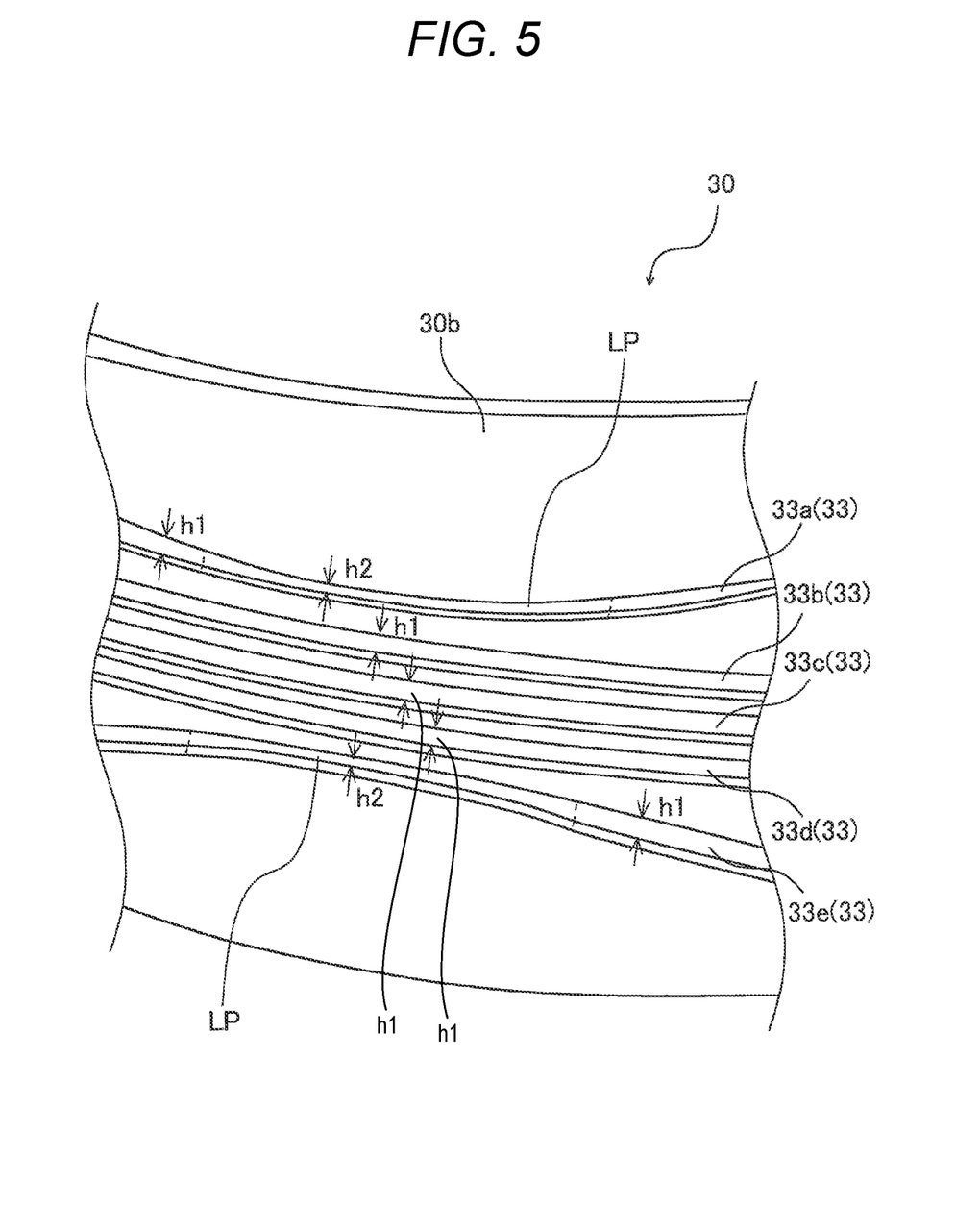
FIG. 5 is an enlarged view of a part of an area illustrated in FIG. 4.

FIG. 5 is an enlarged view of a part of an area illustrated in FIG. 4. As illustrated in FIG. 5, among the plurality of ribs 33, the first and fifth ribs 33a and 33e on the outer side of the rotational direction have portions LP whose heights are lower than those of the second to fourth ribs 33b to 33d on the inner side of the rotational direction. That is, in the case of the curved first and fifth ribs 33a and 33e, the height is lower in a portion on the central side than both end sides of the rotation axis AR. For example, the plurality of ribs 33 have a height h1 from the surface 30b on the opposite side, but only the vicinities of the central portions of the first and fifth ribs 33a and 33e have heights h2 lower than the height h1.

Next, an operation of the head-up display device 1 according to the embodiment will be described with reference to FIGS. 2 to 5.

First, in the embodiment, since the concave mirror 30 includes the plurality of ribs 33, the rigidity is ensured. Therefore, it is not necessary to increase a thickness of the concave mirror 30 or use a highly rigid material.

Further, in the plurality of ribs 33, the first and fifth ribs 33a and 33e on the outer side of the rotational direction have portions LP whose height is lower than that of the second to fourth ribs 33b to 33d on the inner side of the rotational direction. Therefore, when the concave mirror 30 is rotated to adjust the display height of the virtual image I, the first and fifth ribs 33a and 33e on the outer side of the rotational direction, which are most likely to interfere with the housing B, are lowered, so that interference with the housing B is suppressed.

In particular, with respect to the first and fifth ribs 33a and 33e located on the outermost side of the rotational direction, portions on the central side than the both end sides of the rotation axis AR are curved from the outer side of the rotational direction toward the inner side of the rotational direction. Therefore, in the concave mirror 30 where the central side of the rotation axis AR is likely to interfere, the portion which easily interferes is curved inward in the rotational direction, and thus the interference with the housing B is effectively suppressed.

Further, in the case of the first and fifth ribs 33a and 33e located on the outermost side of the rotational direction, the height is lower in the portion on the central side than both end sides of the rotation axis AR. Therefore, in the concave mirror 30 where the central side of the rotation axis AR is likely to interfere, the portion where the interference is likely to occur is lowered and both end sides where it is difficult to interfere are raised to ensure the rigidity of the concave mirror 30.

In this way, in the head-up display device 1 according to the embodiment, since the concave mirror 30 has the plurality of ribs 33, it is not necessary to increase the thickness of the concave mirror 30 and it is not necessary to make the material highly rigid. Therefore, it is possible to suppress the prolongation of the manufacturing time and the deterioration of the quality. Furthermore, in the plurality of ribs 33, the portion on the outer side of the rotational direction centered at the rotation axis AR has the portion LP whose height is set to be lower than that of the portion on the inner side of the rotational direction. Therefore, it has the portion LP whose height is lowered at a place, which is the portion on the outer side of the rotational direction, where it easily interferes with the housing B when the concave mirror 30 is rotated, and thus interference with the housing B is suppressed by an amount of the lowered height. Therefore, it is possible to provide the head-up display device 1 capable of suppressing an increase in the size of the housing B while suppressing a prolongation of the manufacturing time and a deterioration in quality.

Further, since the head-up display device 1 is provided with the plurality of ribs 33, it can contribute to making the mirror body 31 thinner, and thus can contribute to an increase in a rotation angle centered at the rotation axis AR. In addition, a position of the center of gravity can be adjusted by adjusting the height of rib 33 and vibration resistance can be improved.

In addition, the plurality of ribs 33 are formed along the rotation axis AR direction and the first and fifth ribs 33a and 33e on the outer side of the rotational direction centered at the rotation axis AR have portions LP whose heights are lower than those of the second to fourth ribs 33b to 33d on the inner side of the rotational direction. Therefore, when the plurality of ribs 33 are formed along the direction of the rotation axis AR, it is possible to effectively form the lowered portions LP at required positions (i.e., at the specific ribs 33a and 33e in the embodiment).

Further, the first and fifth ribs 33a and 33e (at least one of the plurality of ribs 33) are formed so that the central side is curved toward the inner side of the rotational direction. Therefore, in the concave mirror 30, the first and fifth ribs 33a and 33e are formed so as to avoid the central portion on the outer side of the rotational direction that most easily interferes with the housing B. As a result, interference with the housing B can be efficiently suppressed.

Further, the heights of the first and fifth ribs 33a and 33e (at least one of the plurality of ribs 33) are lower on the central side than on both end sides of the rotation axis AR. Therefore, in the concave mirror 30, the first and fifth ribs 33a and 33e are lowered on the central side, which is most likely to interfere with the housing B. As a result, compared with the case where the first and fifth ribs 33a and 33e are lowered as a whole, while producing high rigidity on both end sides, it is possible to efficiently suppress interference with the housing B at locations on the central side where interference is likely to occur.

Next, a second embodiment of the present disclosure will be described. The head-up display device 1 according to the second embodiment is the same as that of the first embodiment, but the configuration is partially different. Hereinafter, differences from the first embodiment will be described.

Figure 6:
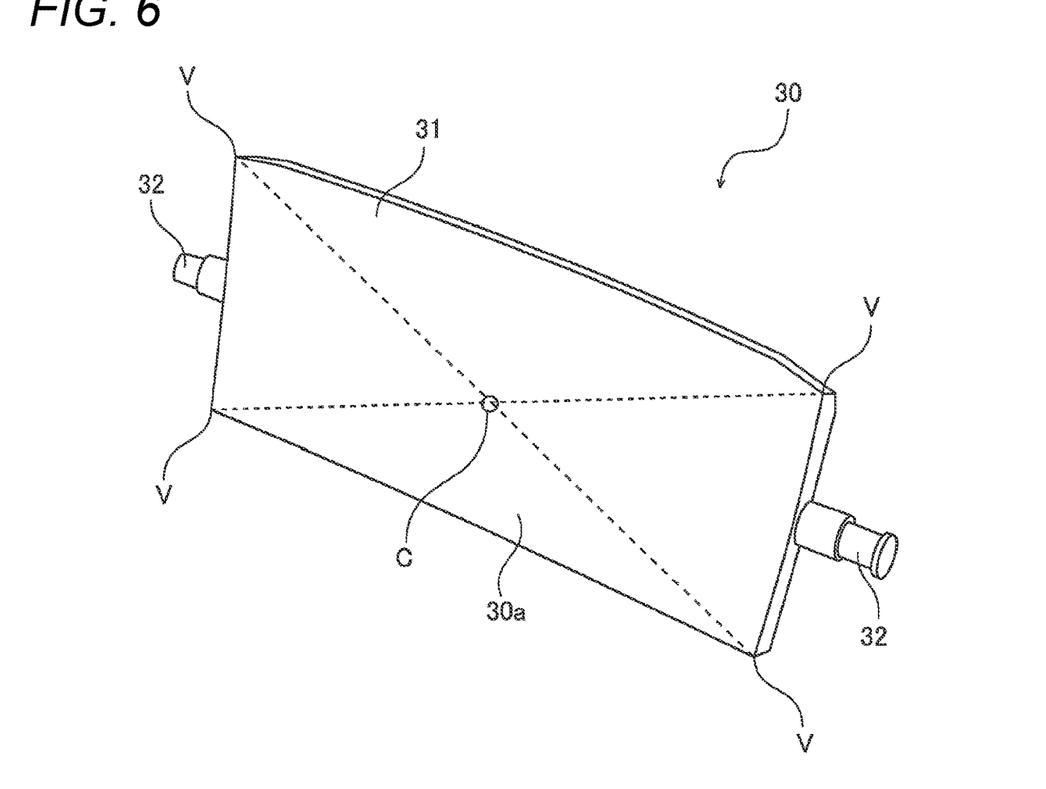
FIG. 6 is a perspective view of a concave mirror according to a second embodiment.
Figure 7:
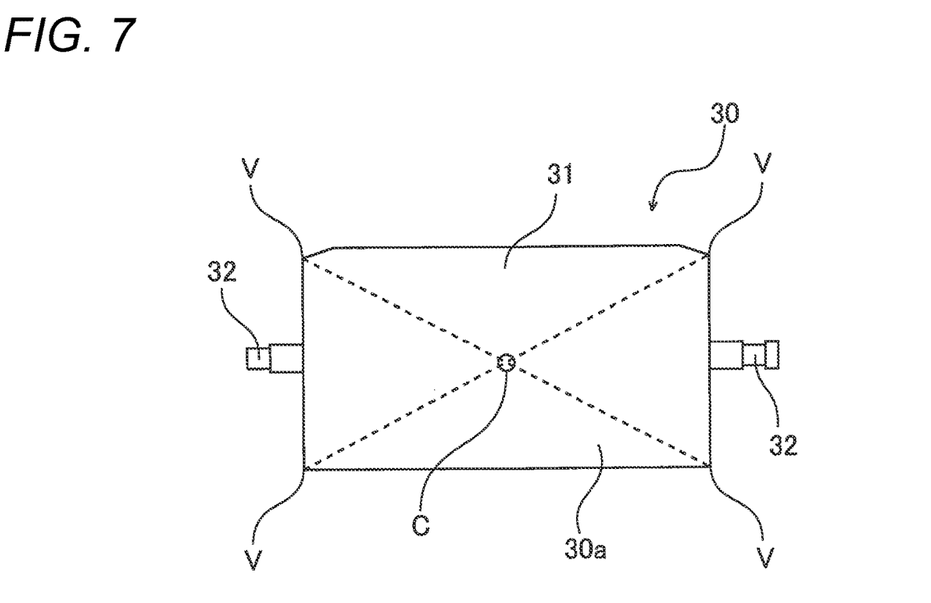
FIG. 7 is a front view of the concave mirror according to the second embodiment.

FIG. 6 is a perspective view of the concave mirror 30 according to the second embodiment and FIG. 7 is a front view of the concave mirror 30 according to the second embodiment. As illustrated in FIGS. 6 and 7, in the concave mirror 30 according to the second embodiment, the mirror body 31 is substantially rectangular when viewed from the front. Therefore, in the mirror body 31, a distance from each vertex V to a center point C of the mirror body 31 is substantially uniform (for example, the error between the maximum distance and the minimum distance is 10% or less) in a plan view.

Here, when the distance from each vertex V to the center point C is not substantially uniform, such as when the mirror body 31 is a trapezoid or a parallelogram, if the vehicle vibrates, a torsional force based on the difference in distance is applied to the mirror body 31. When such a force is applied for a long period of time, the reflection surface 30a will be distorted, and thus the virtual image I will also be distorted.

However, in the second embodiment, since the mirror body 31 has a substantially rectangular shape when viewed from the front, the torsional force generated due to the difference in distance from each vertex V to the center point C is suppressed.

In this way, with the head-up display device 1 according to the second embodiment, similar to the first embodiment, it is possible to provide the head-up display device 1 capable of suppressing an increase in the size of the housing B while suppressing a prolongation of the manufacturing time and a deterioration in quality. In addition, interference with the housing B can be efficiently suppressed.

Further, according to the second embodiment, the mirror body 31 has a substantially rectangular shape in which the distance from each vertex V to the center point C of the mirror body 31 is substantially uniform. Therefore, for example, the torsional force which tends to occur when the mirror body 31 has a shape in which the distance from each vertex V to the center point C is not uniform, such as a trapezoid shape or a parallelogram shape, is suppressed. Therefore, it can contribute to the prevention of distortion of the virtual image I without additional members.

Although the present disclosure is described above based on the embodiments, the present disclosure is not limited to the embodiments described above. Changes may be made without departing from the spirit of the present disclosure, or techniques of the embodiments or known or well-known techniques may be combined.

For example, in the embodiment, the portions LP having a low height are formed in both the upper first rib 33a and the lower fifth rib 33e, which are located on the outer side of the rotational direction. However, the present disclosure is not limited to this, the portion LP having a low height may be formed in only one of the upper side and the lower side. Similarly, both of the upper first rib 33a and the lower fifth rib 33e, which are located on the outer side of the rotational direction, are curved to the inner side of the rotational direction. However, the present disclosure is not limited to this and only one of them may be curved.

Further, in the embodiment, the height of a part (i.e., portion LP) of the first rib 33a and the fifth rib 33e on the outer side of the rotational direction is lower than that of the second to fourth ribs 33b to 33d on the inner side of the rotational direction. However, the present disclosure is not limited to this, the height of the first rib 33a and the fifth rib 33e may be lower than those of the second to fourth ribs 33b to 33d on the inner side of the rotational direction as a whole.

Further, in the embodiment, the first rib 33a and the fifth rib 33e may extend linearly in a plan view as in the second to fourth ribs 33b to 33d without being curved.

Further, in the embodiment described above, the second and fourth ribs 33b and 33d are formed linearly along the rotation axis AR in a plan view. However, the present disclosure is not limited to this, similarly to the first and fifth ribs 33a and 33e, the central side may be curved from the outer side of the rotational direction toward the inner side of the rotational direction.

In addition, it goes without saying that in the embodiment described above, the rigidity can be adjusted by appropriately changing the number of ribs 33, the mounting position, and the like. In particular, by increasing the number of ribs 33, the thickness of the auxiliary side wall 34 can be suppressed, which can contribute to compactness.

Further, in the embodiment, the concave mirror 30 is provided. However, the present disclosure is not limited to this and, as long as it reflects the display light ray and projects the display image, it may be provided with a concave-convex mirror, or may be provided with a convex mirror as illustrated in FIGS. 8 and 9 described below.

Figure 8:
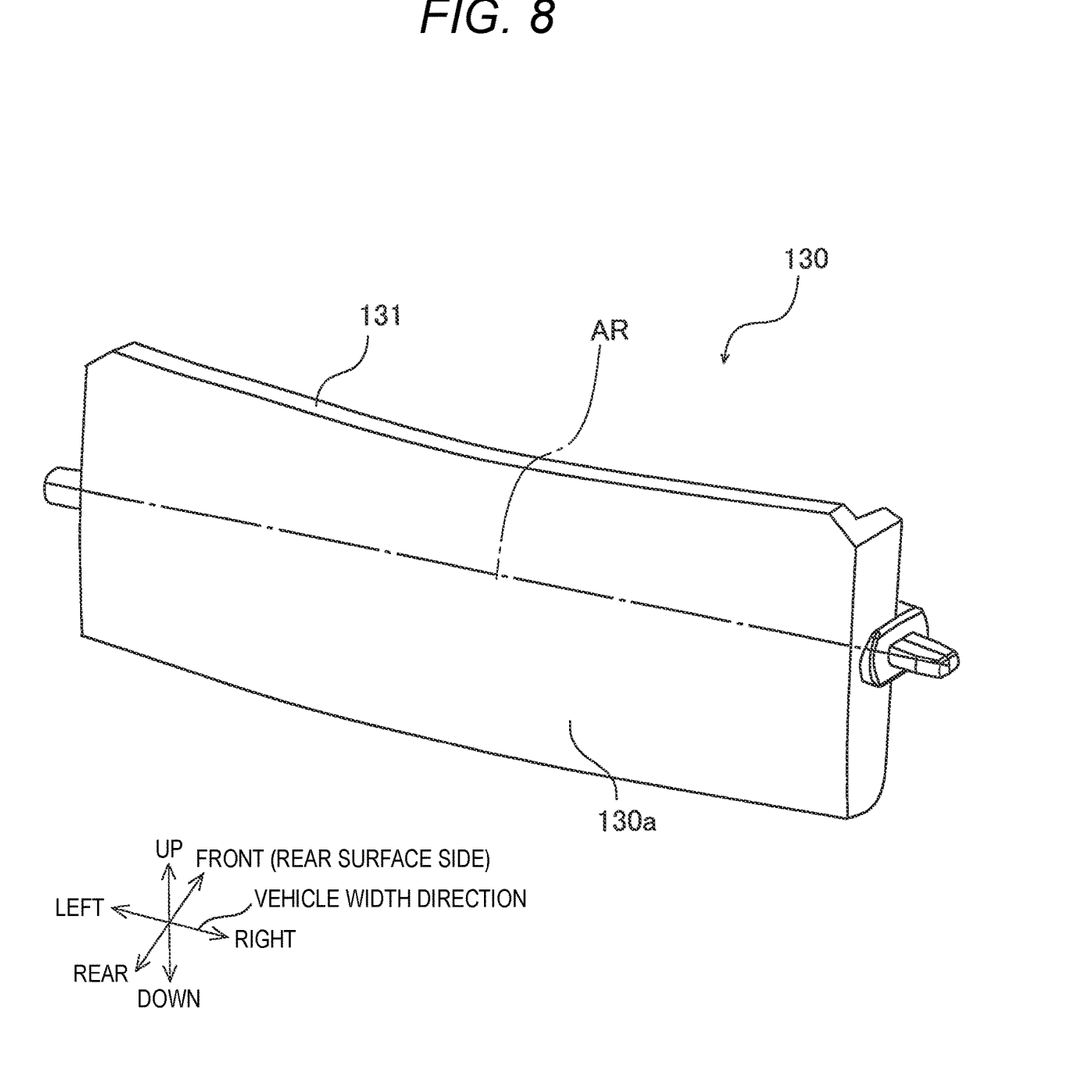
FIG. 8 is a front perspective view illustrating details of a convex mirror according to a modification example.
Figure 9:
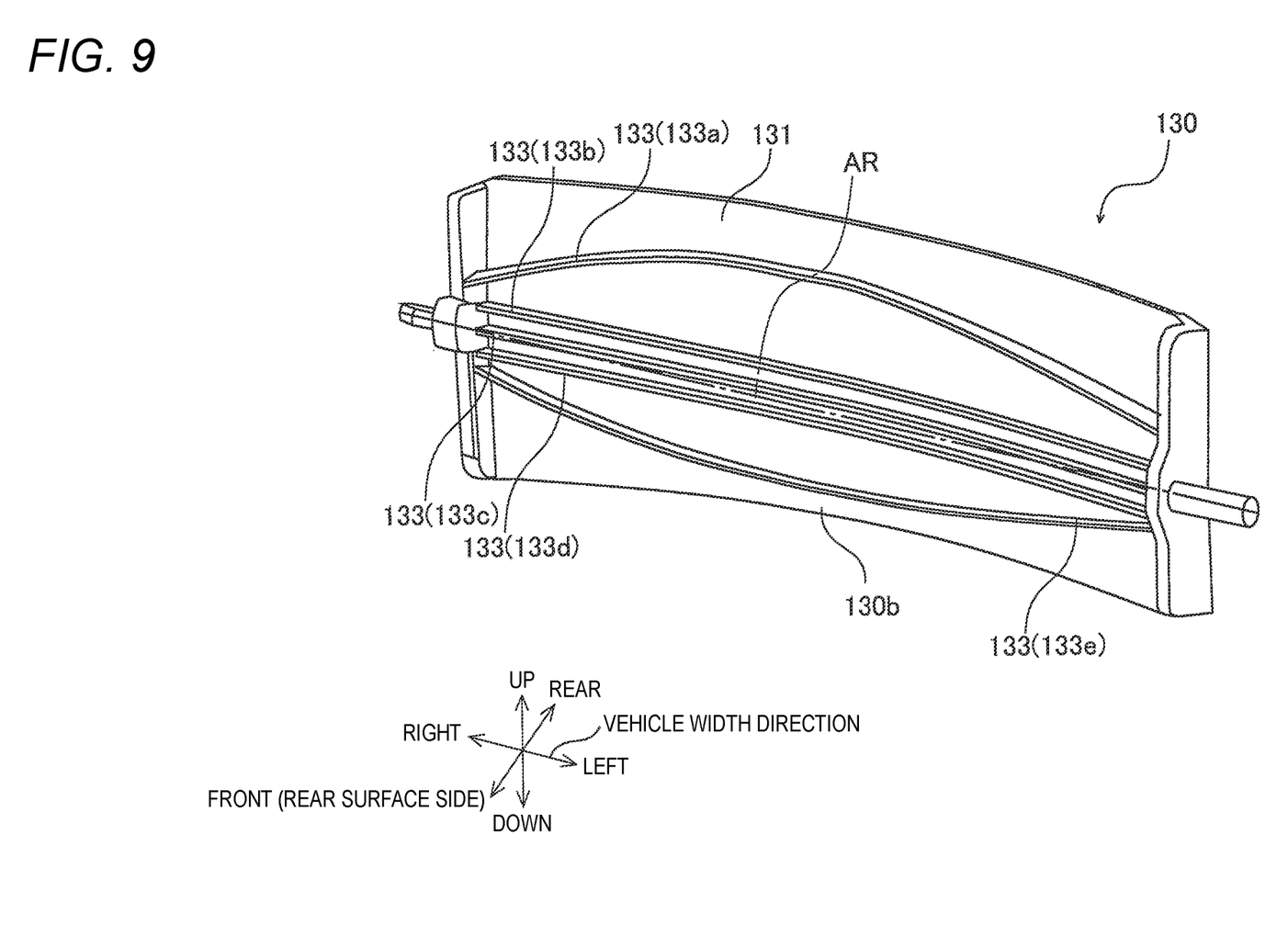
FIG. 9 is a rear perspective view illustrating details of the convex mirror according to the modification example.

FIG. 8 is a front perspective view illustrating the details of the convex mirror according to a modification example and FIG. 9 is a rear perspective view illustrating the details of the convex mirror according to the modification example. As illustrated in FIGS. 8 and 9, the head-up display device 1 may include a convex mirror (reflection member) 130 instead of the concave mirror 30.

Similar to the concave mirror 30, the convex mirror 130 includes a mirror body 131 having a horizontally long reflection surface 130a whose longitudinal direction is parallel to the vehicle width direction. The mirror body 131 has a curved plate structure in which the reflection surface 130a side protrudes and a surface 130b on an opposite side to the reflection surface 130a is recessed.

Further, the convex mirror 130 includes a plurality of ribs 133 as illustrated in FIG. 9. The plurality of ribs 133 are wall members which protrude forward from the surface 130b and are composed of first to fifth ribs 133a to 133e. The first to fifth ribs 133a to 133e are provided so as to extend substantially in the vehicle width direction (direction along the rotation axis AR).

In the first rib 133a upwardly farthest from the rotation axis AR and the fifth rib 133e downwardly farthest from the rotation axis AR of the first to fifth ribs 133a to 133e, portions on the central side than both end sides of the rotation axis AR are formed to be curved from the inner side of the rotational direction toward the outer side of the rotational direction (that is, the rotation axis AR side). On the other hand, the second to fourth ribs 133b to 133d provided in the vicinity of the rotation axis AR are formed linearly along the rotation axis AR in a plan view.

Here, it is preferable that the first rib 133a and the fifth rib 133e be also curved with a constant curvature as similar to the first rib 33a and the fifth rib 33e described in the embodiment. Further, it is preferable that the curvature of the first rib 133a and the curvature of the fifth rib 133e be set to the same value. Similar to the first rib 33a and the fifth rib 33e described in the embodiment, the first rib 133a and the fifth rib 133e also have portions LP (see FIG. 5) in which the height is lowered. The low-height portion LP may be formed only on the central side of the rotation axis AR. However, since the modification example includes the convex mirror 130, it may be formed only on both end sides of the rotation axis AR. Further, the heights of the first rib 133a and the fifth rib 133e may be lower than those of the second to fourth ribs 133b to 133d as a whole.

Figure 10:
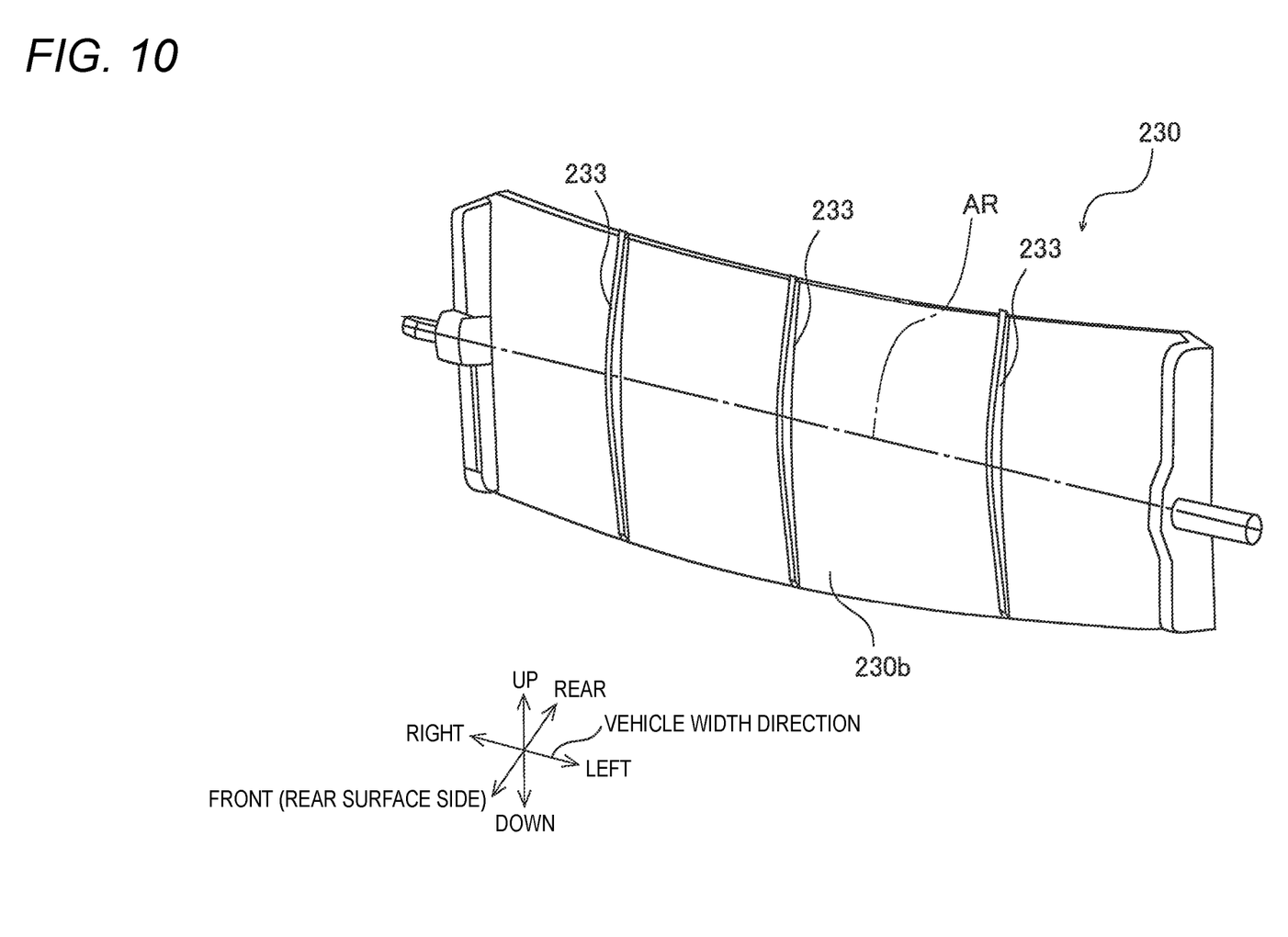
FIG. 10 is a rear perspective view illustrating details of a concave mirror according to a second modification example.

FIG. 10 is a rear perspective view illustrating the details of a concave mirror according to a second modification example. In the second modification example, as illustrated in FIG. 10, a plurality of (three) ribs 233 are provided on a rear surface side (that is, a surface 230b on an opposite side to a reflection surface 230a) of the concave mirror 230. The plurality of ribs 233 extend in a direction orthogonal to the rotation axis AR and are provided so as to extend in an up-down direction in the state illustrated in FIG. 10.

The plurality of ribs 233 have substantially the same shape and the height from the surface 230b is high near the rotation axis AR and gradually decreases toward ends in the up-down direction.

According to such a second modification example, not only can the same effect as that of the embodiment be obtained, but also interference with housing B can be suppressed even when the extension direction of the rib 233 is not along the rotation axis AR but along the direction orthogonal to the rotation axis AR.

Figure 11:
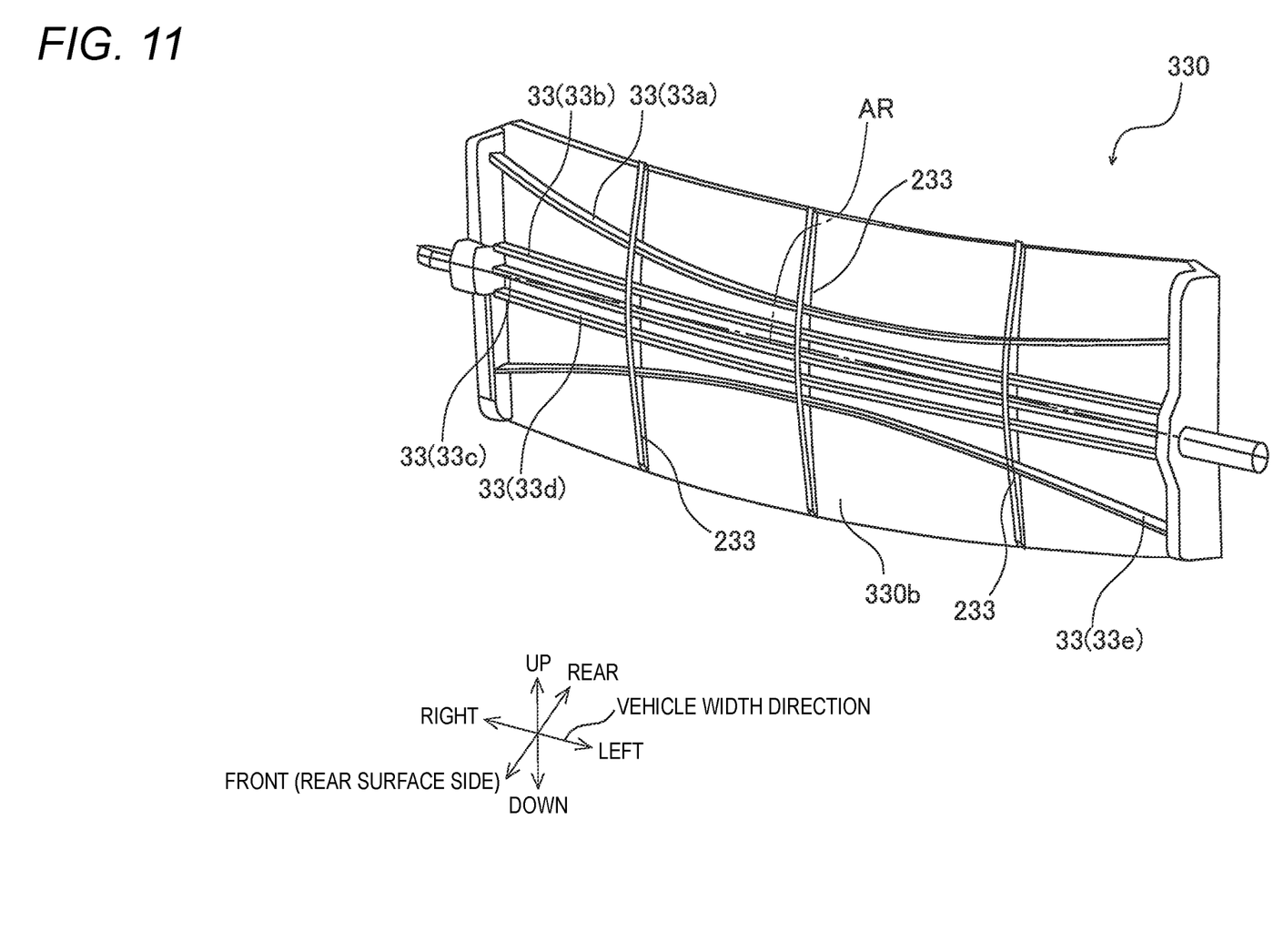
FIG. 11 is a rear perspective view illustrating details of a concave mirror according to a third modification example.

FIG. 11 is a rear perspective view illustrating details of a concave mirror according to a third modification example. In the third modification example, as illustrated in FIG. 11, a shape is formed such that the first embodiment and the second modification example are combined. That is, in a concave mirror 330, a surface 330b on an opposite side is provided with a plurality of ribs 33 approximately extending along the rotation axis AR and a plurality of ribs 233 extending approximately along a direction orthogonal to the rotation axis AR. Each of the ribs 33 and 233 has the same shape as described above. Therefore, the effect of combining both can be obtained.

According to a first aspect of the present disclosure, a head-up display device (1) includes: a display (10) configured to emit a display light ray therefrom, a reflection member (30, 130, 230, 330) configured to pivot around a rotation axis (AR) and reflect the display light ray to project a display image; and a housing (B) configured to accommodate the reflection member (30, 130, 230, 330). The reflection member (30, 130, 230, 330) has a plurality of ribs (33a-33e, 133a-133e) protruding from a surface (30b, 130b, 230b, 330b) on an opposite side to a reflection surface (30a, 130a) which reflects the display light ray, and the plurality of ribs (33a-33e, 133a-133e) have a portion in which a height on an outer side in a rotational direction centered at the rotation axis (AR) is lower than that on an inner side in the rotational direction.

According to a second aspect of the present disclosure, the plurality of ribs (33a-33e, 133a-133e) may be formed along a direction in which the rotation axis (AR) extends, and among the plurality of ribs (33a-33e, 133a-133e), a rib (33a-33e, 133a-133e) on the outer side in the rotational direction may have a portion whose height is lower than that of a rib (33a-33e, 133a-133e) on the inner side in the rotational direction.

According to a third aspect of the present disclosure, the reflection member (30, 130, 230, 330) may be a concave mirror (30, 230, 330) in which the reflection surface (30a, 130a) is concave and the surface (30b, 130b, 230b, 330b) on the opposite side thereto is convex, and at least one of the plurality of ribs (33a-33e, 133a-133e) may be formed such that a portion on a central side than both end sides of the rotation axis (AR) is curved from the outer side towards the inner side.

According to a fourth aspect of the present disclosure, at least one of the plurality of ribs (33a-33e, 133a-133e) may be formed such that a height on a central side is lower than that on both end sides of the rotation axis (AR).

According to a fifth aspect of the present disclosure, the reflection member (30, 130, 230, 330) may include a mirror body (31, 131) having the reflection surface (30a, 130a), and the mirror body (31, 131) may have a substantially rectangular shape in which a distance from each vertex (V) to a center point (C) of the mirror body (31, 131) is substantially uniform in a plan view.

According to a sixth aspect of the present disclosure, the plurality of ribs (33a-33e, 133a-133e) may be formed along a direction orthogonal to the rotation axis (AR), and the ribs 33a-33e, 133a-133e) may have a portion in which a height on the outer side in the rotational direction is lower than that on the inner side of the rotational direction.

According to the present disclosure, it is possible to provide a head-up display device capable of suppressing an increase in the size of the housing while suppressing a prolongation of manufacturing time and deterioration of quality.

What is claimed is:

1. A head-up display device comprising:
   a display configured to emit a display light ray therefrom,
   a reflection member configured to pivot around a rotation axis and reflect the display light ray to project a display image; and
   a housing configured to accommodate the reflection member, wherein
   the reflection member has a plurality of ribs protruding from a surface on an opposite side to a reflection surface which reflects the display light ray, and
   among the plurality of ribs, a rib on the outer side in the rotational direction has a portion whose height is lower than that of a rib on the inner side in the rotational direction.

2. The head-up display device according to claim 1, wherein
   the plurality of ribs are formed along a direction in which the rotation axis extends.

3. The head-up display device according to claim 2, wherein
   the reflection member is a concave mirror in which the reflection surface is concave and the surface on the opposite side thereto is convex, and
   at least one of the plurality of ribs is formed such that a portion on a central side than both end sides of the rotation axis is curved from the outer side towards the inner side.

4. The head-up display device according to claim 2, wherein
   at least one of the plurality of ribs is formed such that a height on a central side is lower than that on both end sides of the rotation axis.

5. The head-up display device according to claim 2, wherein
   the reflection member includes a mirror body having the reflection surface, and
   the mirror body has a substantially rectangular shape in which a distance from each vertex to a center point of the mirror body is substantially uniform in a plan view.

6. The head-up display device according to claim 1, wherein
   the plurality of ribs are formed along a direction orthogonal to the rotation axis, and
   the ribs have a portion in which a height of a rib on the outer side in the rotational direction is lower than that of the same rib on the inner side of the rotational direction.

* * * * *